United States Patent Office 3,002,975
Patented Oct. 3, 1961

3,002,975
PROCESS FOR THE PREPARATION OF
1,3-DIHALO-URACILS
Frank B. Slezak, Painesville, Ohio, assignor to Diamond Alkali Company, Cleveland, Ohio, a corporation of Delaware
No Drawing. Filed Aug. 25, 1958, Ser. No. 757,102
3 Claims. (Cl. 260—260)

The present invention relates to biologically active compositions comprising as an active ingredient a halogenated hydrouracil of the structure:

(I)

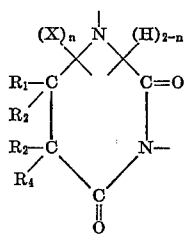

wherein $n$ is a number from 1 to 2, inclusive; X is a halogen atom, e.g., fluorine, chlorine, bromine, and iodine; $R_1$, $R_2$, $R_3$, and $R_4$ are selected from the group consisting of hydrogen atoms, alkyl radicals, such as methyl, ethyl, propyl, butyl, heptyl, decyl, and their isomers, aryl radicals, such as phenyl or naphthyl radicals, and halogen atoms as well as halogen substituted derivatives of the foregoing, e.g., chlorine and bromine substituted derivatives, at least one of $R_1$, $R_2$, $R_3$, and $R_4$ being alkyl or aryl, i.e., other than hydrogen; and to their preparation and application.

Preferred illustrative compounds falling within the scope of generic Structure I may be represented by the structure:

(II)

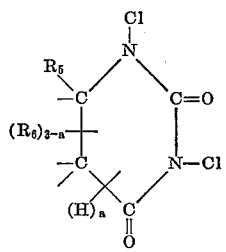

wherein $a$ is a number from 1 to 3, inclusive; $R_5$ and $R_6$ are alkyl radicals, preferably lower alkyl radicals, i.e., those having from 1 to 10 carbon atoms.

Also falling within the scope of generic Structure I are compounds represented by Structure II wherein the chlorine atoms bonded to the nitrogen atoms are bromine atoms.

Compounds within the scope of generic Structures I and II, wherein "halo" refers to chlorine, bromine, fluorine, and/or iodine, are:

1,3-dihalo-6-methylhydrouracil
1,3-dihalo-5-methylhydrouracil
1,3-dihalo-5-butyl-6-phenylhydrouracil
1,3-dihalo-5,6-diethylhydrouracil
1,3-dihalo-5-methyl-6-phenylhydrouracil
1,3-dihalo-6-heptylhydrouracil
1,3-dihalo-6-isopropylhydrouracil
1,3-dihalo-6-(2-naphthyl)hydrouracil
1,3-dihalo-5-phenylhydrouracil
1,3-dihalo-5-ethyl-5-butylhydrouracil
1,3-dihalo-5-phenyl-5-methylhydrouracil
1,3-dihalo-6-propyl-6-methylhydrouracil
1,3-dihalo-5,5,6-trichlorohydrouracil
1,3-dihalo-5-chloro-6-bromohydrouracil Preferred compounds of this type are those in which the 1,3-dihalo-hydrouracil is 1,3-dichloro and 1,3-dibromohydrouracil.

Compounds within the scope of generic Structure I may be prepared by halogenating a compound of the structure:

(III)

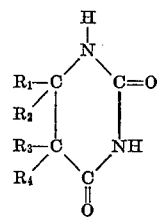

wherein $R_1$, $R_2$, $R_3$, and $R_4$ are as under Structure I. This halogenation may be carried out at a temperature of about 5°–30° C., typically with cooling, the preferred temperature being at room temperature. Although the time of the reaction is not critical, it may typically be carried out between ¼ and 4 hours, preferably 1 to 2 hours. In general it is ordinarily preferred to employ substantially stoichiometric ratios of the reactants; however, considerable departure from these ratios can be tolerated in many instances, without serious detriment to either yield or quality of product; typically 10 to 50 parts by weight of the hydrouracil is combined with 8 to 105 parts by weight of halogen. The reaction is typically carried out in the presence of water, e.g., 10 to 50 parts by weight hydrouracil, 10 to 105 parts by weight halogen in 300 to 600 parts by weight water. Although water is preferred as a solvent for the reaction, organic solvents such as chlorinated hydrocarbons may be used, e.g., carbon tetrachloride, trichloroethylene, trichlorobenzene, tetrachlorobenzene, ethylene dichloride, and the like. The final product may be isolated typically through recrystallization from water or an organic solvent, such as hydrocarbon solvents, e.g., benzene and toluene, and chlorinated hydrocarbon solvents as previously defined. These compounds typically have a better than 50% available halogen content, i.e., 50 to 77.48% available chlorine content, or 50 to 118% available bromine content.

Compounds within the scope of generic Structure II may be prepared by chemically reacting chlorine with a compound represented by the structure:

(IV)

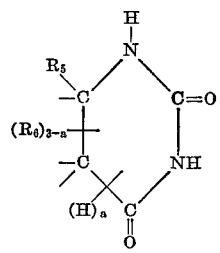

wherein $a$, $R_5$, and $R_6$ are as defined. Essentially the same reaction conditions described under the preparation of generic Structure I are applicable in the chlorination of a compound of Structure IV.

Compounds within the scope of generic Structure II in which the chlorine atoms bonded to the nitrogen atoms are bromine atoms may be prepared by chemically reacting bromine with a compound represented by Structure IV, as above. The reaction conditions are essentially the same in this preparation as in the preparation of a compound represented by generic Structure I.

The hydrouracils of this invention comprise products which are useful as chemical intermediates and exhibit a high degree of biological activity in addition to applications in the field of medicinal agents. More specifically these compounds are active fungicides, such as for the control of undesirable spore germination; nematocides, such as for the control of plant and nonplant parasite nematodes and show an exceptionally high degree of bactericidal activity, such as the control of micro-organism growth.

While compounds of this invention may be employed in a variety of applications, biological or otherwise, when employed as biologically active materials it will be understood, of course, that such compounds may be utilized in diverse formulations, both liquid and solid, including finely-divided powders and granular materials as well as liquids such as solutions, concentrates, emulsifiable concentrates, slurries, and the like, depending upon the application intended and the formulation media desired.

These compounds may be used alone or in combination with other known biologically active materials, such as other organic phosphate pesticides, chlorinated hydrocarbon insecticides, pesticides, foliage and soil fungicides, pre- and post-emergent herbicides, and the like.

Thus, it will be appreciated that compounds of this invention may be employed to form biologically active substances containing such compounds as essential active ingredients thereof which compositions may also include finely-divided dry or liquid diluents, extenders, fillers, conditioners, including various clays, diatomaceous earth, talc, spent catalyst, alumina-silica material, liquids, solvents, diluents, or the like, including water and various organic liquids such as hexane, heptane, benzene, toluene, chlorinated benzene, xylene, carbon disulfide, carbon tetrachloride, tetrachloroethylene, petroleum distillate fractions, and various mixtures thereof.

When liquid formulations are employed or dry materials prepared which are to be use in liquid form, it is desirable in certain instances additionally to employ a wetting, emulsifying, or dispersing agent to facilitate use of the formulation, e.g., Tritron X–155 (alkyl aryl polyether alcohol, U.S. Patent 2,504,064). Suitable surface active agents for example are set forth in an article by John W. McCutcheon in "Soap and Chemical Specialties," vol. 31, Nos. 7–10 (1955).

The term "carrier" as employed in the specification and claims is intended to refer broadly to materials containing a major portion of a biologically active or other formulation and hence includes finely-divided materials, both liquids and solids, as aforementioned conveniently used in such applications.

While compounds of this invention demonstrate biological activity, it is also significant that these N-halogen organic compounds are strong oxidizing agents having properties which lend themselves to applications in the field of batteries, and specifically to application as cathode materials in primary batteries.

Typically a cathode containing an active amount of a compound within the scope of Structure I, e.g., a chlorinated hydrouracil is constructed by intimately mixing the hydrouracil with a cathode carrier such as graphite or magnetite, e.g., mixing about two parts by weight of the halogenated hydrouracil with one part by weight of carbon, i.e., graphite. The resulting mixture is placed in a mold, e.g., a paper-lined can and a carbon rod is then inserted. The electrode thus formed may then be manufactured into a cell, such as that constructed by removing the thus-formed electrode from the mold, wrapping with a piece of absorbent nonwoven fabric material and magnesium sheet. Discharge may be obtained by immersing the foregoing assembly in an electrolyte, i.e., a solution comprising essentially an aqueous solution of magnesium bromide, e.g., 250 g. of $MgBr_2$ in 1 liter of water, and/or an aqueous solution of sodium dichromate, e.g., 1.0 g. of $Na_2Cr_2O_7$ in 1 liter of water.

A preferred embodiment of the present invention is a battery containing a cathode having as an active ingredient a compound according to Structure I.

Another embodiment would be a battery comprising an anode, electrolyte, and cathode; containing as an active ingredient a compound according to Structure I. The preferred compounds in these embodiments are those enumerated previously within the scope of Structures I and II.

The effectiveness of these new cathode materials may also be demonstrated employing the technique and apparatus disclosed in an article by C. K. Morehouse and R. Glickman in "The Journal of the Electrochemical Society," vol. 103, No. 2, page 94.

The halogenated hydrouracils of this invention have also demonstrated utility as bleaching agents, which activity is further enhanced by the fact that compounds of this invention are normally solids and thus inherently provide a significant improvement over many prior conventional bleaching and sanitizing agents including the well-know and widely-used sodium hypochlorite solution. Moreover the fact that compounds of this invention are solids provides increased convenience by way of easier handling and reduced likelihood of incurring damage by breakage, freezing or spilling.

An embodiment of the invention is a sanitizing composition, that is, a composition employed in contacting or destroying conditions, organisms, or bacteria detrimental to either human or animal life, containing a sanitizing amount of a compound within the scope of Structure I. This is intended also to include carriers for the subject toxic ingredients. In practice, the method of sanitizing may be carried out by contacting the detrimental conditions, i.e., organisms, bacteria, and material, space or area infested, with a sanitizing amount of a compound within Structure I. It is obvious that the amount of toxic agent or sanitizing composition required will be dictated by the degree of infestation and the degree of sanitation needed or desired and the material or environment to be sanitized.

It is also a specific feature of this invention that compounds of the foregoing type are advantageously employed, not only singly, but in admixture wherein in many instances a synergistic effect is observed insofar as bleaching and sanitizing activity is concerned.

In relation to utility as a bleaching and sanitizing agent a preferred embodiment of the present invention comprises a mixture of water and a compound within the scope of Structure I, e.g., a sanitizing or bleaching composition comprising essentially water and about 0.0001% to 10% by weight of a compound of Structure I typically in combination with 0% to 10% by weight of a wetting agent.

In order that those skilled in the art may more completely understand the present invention and the preferred methods by which the same may be carried into effect, the following specific examples are offered.

EXAMPLE I

*Preparation of 1,3-dichlorohydrouracil*

22.8 g. (0.2 mol) of hydrouracil is dissolved in 400 ml. of water. 30.0 g. (0.42 mol) of chlorine is passed into this mixture while maintaining a pH range of 1–3 by using 6 N aqueous sodium hydroxide. The resultant product is filtered, washed with a minimum of water and finally with a minimum of a 2% aqueous sodium bicarbonate solution, then filtered under vacuum, followed by drying. The resultant desired $C_4H_4Cl_2N_2O_2$ is indicated by the following elemental analytical data:

| Element | Actual, percent by Weight | Calculated, percent by Weight |
|---|---|---|
| C | 26.6 | 26.3 |
| H | 2.3 | 2.2 |
| Cl | 38.6 | 38.6 |
| N | 15.3 | 15.3 |

EXAMPLE II

In order to evaluate bactericidal activity, the product of Example I is mixed with distilled water containing 5% acetone and 0.01% Triton X-155 at concentration of 8, 4, and 2 p.p.m. Five ml. of this test formulation are put in each of 4 test tubes. To each test tube is added one of the organisms: *Erwinia amylovora*, *Xanthomonas phaseoli*, *Staphylococcus aureus* and *Escherichia coli* in the form of a bacterial suspension in a saline solution from potato-dextrose agar plates. The tubes are then incubated for 4 hours at 30° C. Transfers are then made to sterile broth with a standard 4 mm. loop and the thus-innoculated broth is incubated for 48 hours at 37° C. Using this procedure the product of Example I completely inhibits the growth of the above organisms at each of the concentrations listed.

EXAMPLE III

Spore germination tests on glass slides are conducted via the test tube dilution method adopted from the procedure recommended by the American Phytopathological Society's committee on standardization of fungicidal tests. In this procedure, the product of Example I in aqueous formulations at concentrations of 1000, 100, 10 and 1.0 p.p.m. is tested for its ability to inhibit germination of spores from 7 to 10-day-old cultures of *Alternaria oleracea* and *Monilinia fructicola*. These concentrations refer to initial concentrations before diluting four volumes with one volume of spore stimulant and spore suspension. Germination records are taken after 20 hours of incubation at 22° C. by counting 100 spores. Results indicate that concentrations of less than 1.0 p.p.m. afford disease control for the *A. oleracea* and *M. fructicola*, respectively.

EXAMPLE IV

A tomato foliage disease test is conducted measuring the ability of the product of Example I to protect tomato foliage against infection by the early blight fungus *Alternaria solani*. Tomato plants 5 to 7 inches high of the variety Bonny Best are employed. The plants are sprayed with 100 ml. of test formulation at 2000 p.p.m. (2000 p.p.m. product of Example I—5% acetone—0.01% Triton X-155—balance water) at 40 lbs. air pressure while being rotated on a turntable in a spray chamber. After the spray deposit is dry, the treated plants and comparable untreated controls are sprayed with a spore suspension containing approximately 20,000 conidia of *A. solani* per ml. The plants are held in a 100% humid atmosphere for 24 hours at 70° F. to permit spore germination and infection. After 2 to 4 days, lesion counts are made on the three uppermost fully expanded leaves. Data based on the number of lesions obtained on the control plants shows 44% and 35% disease control, respectively.

EXAMPLE V

To test herbicidal activity, tomato plants, variety Bonny Best, 5 to 7 inches tall; corn, variety Cornell M-1 (field corn), 4 to 6 inches tall; bean, variety Tendergreen, just as the trifoliate leaves are beginning to unfold; and oats, variety Clinton, 3 to 5 inches tall, are sprayed with an aqueous test formulation (6400 p.p.m. product of Example I—5% acetone—0.01% Triton X-155—balance water). The plants are sprayed with 100 ml. at 40 lbs. air pressure while being rotated on a turntable in a spray hood. Records are taken 14 days after treatment and phytotoxicity is rated on a scale from 0 for no injury to 11 for plant kill. Using this procedure results indicate that 1,3-dichlorohydrouracil would cause almost no plant injury.

EXAMPLE VI

To detect root absorption and translocation, tomato plants, variety Bonny Best, 5 to 7 inches tall, and corn plants, variety Cornell M-1 (field corn), 4 to 6 inches tall, are treated by pouring 51 ml. of an aqueous test formulation (2000 p.p.m. product of Example I—5% acetone—0.01% Triton X-155—balance water) onto the soil of 4 inch pots (102 mg./pot or approximately equivalent to 128 lbs./acre) in which the plants are growing. Plants are held under controlled greenhouse conditions for at least 10 days before examination after which phytotoxicity ratings are given based on a scale from 0 for no injury to 11 for plant kill. Using this procedure results indicate that the product of Example I causes no plant injury.

EXAMPLE VII

To evaluate the effect of the product of Example I upon the germination of seeds in soil, a mixture of seed of six crop plants is broadcast in 8 x 8 x 2 inch metal cake pans filled to within one-half inch of the top with composted greenhouse soil. The seed is uniformly covered with about one-quarter inch of soil and watered. After 24 hours, 80 ml. of an aqueous test formulation (320 mg. product of Example I—5% acetone—0.01% Triton X-155—balance water) at 10 lbs. air pressure are spread uniformly over the surface of the pan. This is equivalent to 64 lbs./acre. The seed mixture contains representatives of three broadleafs: turnip, flax, and alfalfa, and three grasses: wheat, millet, and rye grass. Two weeks after treatment records are taken on seedling stand as compared to the controls. Using this procedure results indicte the product of Example I would cause little to no injury to the seeds.

EXAMPLE VIII

Evaluation of the product of Example I as a fumigant poison is carried out by exposing non-plant parasite nematodes (*Panagrellus redivivus*) to the product of Example I in small watch glasses (27 mm. diameter x 8 mm. deep), within a 9 cm. Petri dish. A test formulation containing 500 mg. product of Example I—5% acetone—0.01% Triton X-155—balance water is used. Observations after 24 hours indicate 100% disease control at the 550 p.p.m. concentration.

EXAMPLE IX

*Preparation of 1,3-dichloro-6-methylhydrouracil*

12.8 g. of (0.1 mol) of 6-methylhydrouracil is mixed with 500 ml. of water and to this is added 16.0 g. (0.22 mol) of chlorine while adding 2 ml. of 6 N aqueous sodium hydroxide solution to every g. of chlorine, i.e., maintaining the pH of the solution between 1-2. The desired $C_5H_6Cl_2N_2O_2$ precipitate is filtered under vacuum, washed with a minimum of water and 2% aqueous sodium bicarbonate solution, followed by drying, yielding a white product indicated through the following elemental analytical data:

| Element | Actual, percent by Weight | Calculated, percent by Weight |
|---|---|---|
| C | 30.63 | 30.65 |
| H | 3.04 | 3.07 |
| Cl | 37.3 | 36.0 |
| N | 14.2 | 14.2 |

This product melts at 87°-87.5° C. and contains about 72% available chlorine.

EXAMPLE X

Employing the fungicidal spore germination evalulation given in Example III, the product of Example IX afforded complete control at less than 1 p.p.m.

EXAMPLE XI

Employing the bactericidal evaluation given in Example II, the product of Example IX afforded better than 90% bacterial growth inhibition at a concentration of 500 p.p.m.

EXAMPLE XII

Employing the herbicidal evaluation given in Example V, the product of Example IX indicates that 1,3-dichloro-6-methylhydrouracil would cause no plant injury when used as a pesticide.

EXAMPLE XIII

Employing the procedure given in Example VI, results indicate that the product of Example IX would cause no injury to plants.

EXAMPLE XIV

Employing the procedure given in Example VII, results indicate that the product of Example IX would cause no plant injury.

EXAMPLE XV

Employing the procedure given in Example VIII, 1,3-dichloro-6-methylhydrouracil affords 100% nematode control at a concentration of 500 p.p.m.

EXAMPLE XVI

Preparation of 1,3-dibromohydrouracil 11.4 g. (0.1 mol) of hydrouracil is dissolved in 500 ml. of water. To this solution 37.0 g. (0.23 mol) of bromine is added dropwise while maintaining the pH of the reaction mixture between 5.0 and 10.0 by the addition of about 40 ml. of 6 N aqueous sodium hydroxide. The resulting desired precipitate is filtered off, dried, washed with water and aqueous 2% sodium bicarbonate solution and dried. This desired $C_4H_4Br_2N_2O_2$ melts with decomposition at 268°–270° C.

EXAMPLE XVII

Preparation of 1,3-dibromo-6-methylhydrouracil 12.8 g. (0.1 mol) of 6-methylhydrouracil is suspended in 500 ml. of water and to this is added 37.0 g. (0.23 mol) of bromine dropwise with stirring while maintaining the reaction mixture at a pH between 4.0 and 10.0 by the dropwise addition of aqueous 6 N sodium hydroxide. The desired product resulting is filtered, washed with water and aqueous 2% sodium bicarbonate solution and dried. This desired $C_5H_6Br_2N_2O_2$ melts at 130°–131° C. and is indicated by the following elemental analytical data:

| Element | Actual, percent by Weight | Calculated, percent by Weight |
|---|---|---|
| C | 21.3 | 21.2 |
| H | 2.0 | 2.1 |
| available Br | 111 | 112 |

EXAMPLE XVIII

In order to evaluate the bleaching efficiency of the compounds of the present invention, a test is carried out whereby 1,3-dichlorohydrouracil is employed in the bleaching of tea-stained muslin. In this test, ordinary muslin is stained until a reflectance reading of about 68 is obtained on a Hunter multipurpose reflectometer. A laundrometer commercially available from the Atlas Electric Devices Company, model P5, type LHD–ES is employed in each of the evaluations. Upon the completion of the staining of the muslin, a bleach solution is made up comprising a 5% aqueous solution of sodium tripolyphosphate. In order to adjust the available chlorine content of the bleach bath to the level of 200 p.p.m., suitable amounts of a concentrated solution of the respective bleach is added to the bath and available chlorine concentration is checked just prior to runing the test by titration against sodium thiosulfate using iodine starch as the indicator. Two test strips of scoured, unbleached, tea-stained muslin are employed as the check and are added to a Mason jar containing 300 ml. of the above 5% sodium tripolyphosphate solution and the 200 p.p.m. of available chlorine. These jars are then immersed in the water bath of the laundrometer for a period of about 20 minutes. At the end of the bleaching treatment, the strips are washed with cold water, dried and ironed. Reflectance of the bleach samples is then evaluated on the Hunter reflectometer. Comparing the results with the reflectance of the sample before bleaching, results are indicated as percent increase in whiteness. Employing this procedure and the product of Example I, at a concentration of 200 p.p.m. available chlorine and employing 1,3-dichloro-5,5-dimethylhydantoin as a commercial comparison, the results indicate at the above concentration, a pH of 9.3, and a temperature of 120° F., 80.5% increase in whiteness whereas the commercial check demonstrates 77.8% increase in whiteness.

EXAMPLE XIX

The following are illustrative bleaching and sanitizing formulations embodying the present invention and suitable wetting agents in detergent compositions. Typically the preferred composition of the present invention comprises 10 to 35 parts by weight of the chlorinated hydrouracil, 0 to 50 parts by weight sodium sulfate, 0 to 25 parts by weight mono basic sodium phosphate hydrate ($NaH_2PO_4 \times H_2O$), 0 to 75 parts by weight sodium tripolyphosphate, and 0 to 10 parts by weight of wetting agent.

It is to be understood that although the invention has been described with specific reference to particular embodiments thereof, it is not to be so limited since changes and alterations therein may be made which are within the full intended scope of this invention as defined by the appended claims.

What is claimed is:

1. The method of preparing compounds of the structure:

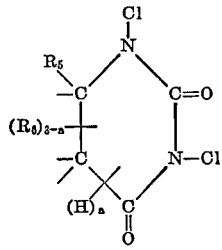

which comprises mixing water and a compound of the structure:

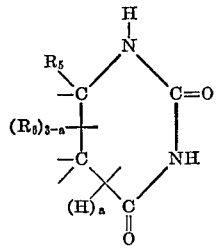

wherein $a$ is a number from 1 to 3 inclusive; $R_5$ and $R_6$ are lower alkyl radicals containing 1 to 10 carbon atoms and passing chlorine into the mixture at a temperature of about 0°–30° C. while maintaining a pH range of 1 to 3 by periodically adding caustic solution.

2. The method of preparing 1,3-dichlorohydrouracil which comprises mixing water and hydrouracil and introducing chlorine into the mixture at a temperature of about 0°–30° C. while maintaining a pH range of 1 to 3 by periodically adding caustic solution.

3. The method of preparing 1,3-dichloro-6-methylhydrouracil which comprises mixing water and 6-methylhydrouracil and introducing chlorine into the mixture at a temperature of about 0°–30° C. while maintaining a pH 3,002,975

| 9 | | | 10 | | |
|---|---|---|---|---|---|
| range of 1 to 2 by the periodic addition of caustic solution. | | | 2,809,146 | Osborn et al. | Oct. 8, 1957 |
| | | | 2,828,308 | Lorenz | Mar. 25, 1958 |
| References Cited in the file of this patent | | | 2,829,186 | Kort | Apr. 1, 1958 |
| UNITED STATES PATENTS | | | 2,853,416 | Kellog | Sept. 23, 1958 |
| 2,226,162 | Dubeau | Dec. 24, 1940 | 2,861,917 | Kosmin | Nov. 25, 1958 |
| 2,658,850 | Cislak | Nov. 10, 1953 | OTHER REFERENCES | | |
| 2,751,277 | Coover et al. | June 19, 1956 | Blitz et al.: Journal fur Praktische Chemie, vol. 113, page 248 (1926). | | |
| 2,751,427 | Woodring | June 19, 1956 | | | |
| 2,760,962 | Vasey | Aug. 28, 1956 | Slezak et al.: J. Org. Chem., vol. 24, pages 571–572 (195). | | |
| 2,802,005 | Heidelberger et al. | Aug. 6, 1957 | | | |

---

UNITED STATES PATENT OFFICE

CERTIFICATION OF CORRECTION

Patent No. 3,002,975                     October 3, 1961

Frank B. Slezak

It is hereby certified that error appears in the above numbered patent requiring correction and that the said Letters Patent should read as corrected below.

Column 1, lines 11 to 21, structure (I) should appear as shown below instead of as in the patent:

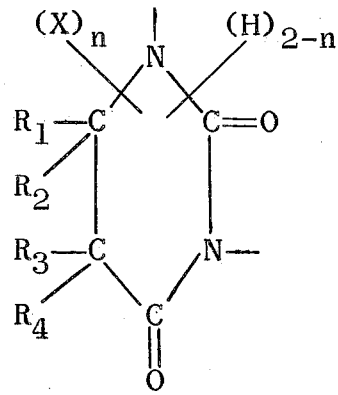

column 6, line 27, for "indicte" read -- indicate --.

Signed and sealed this 17th day of April 1962.

(SEAL)
Attest:

ESTON G. JOHNSON
Attesting Officer

DAVID L. LADD
Commissioner of Patents

UNITED STATES PATENT OFFICE
CERTIFICATION OF CORRECTION

Patent No. 3,002,975            October 3, 1961

Frank B. Slezak

It is hereby certified that error appears in the above numbered patent requiring correction and that the said Letters Patent should read as corrected below.

Column 1, lines 11 to 21, structure (I) should appear as shown below instead of as in the patent:

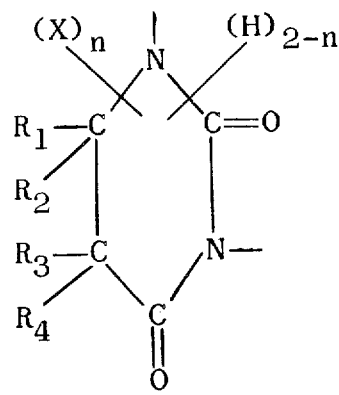

column 6, line 27, for "indicte" read -- indicate --.

Signed and sealed this 17th day of April 1962.

(SEAL)
Attest:

ESTON G. JOHNSON            DAVID L. LADD
Attesting Officer            Commissioner of Patents